Patented June 5, 1934

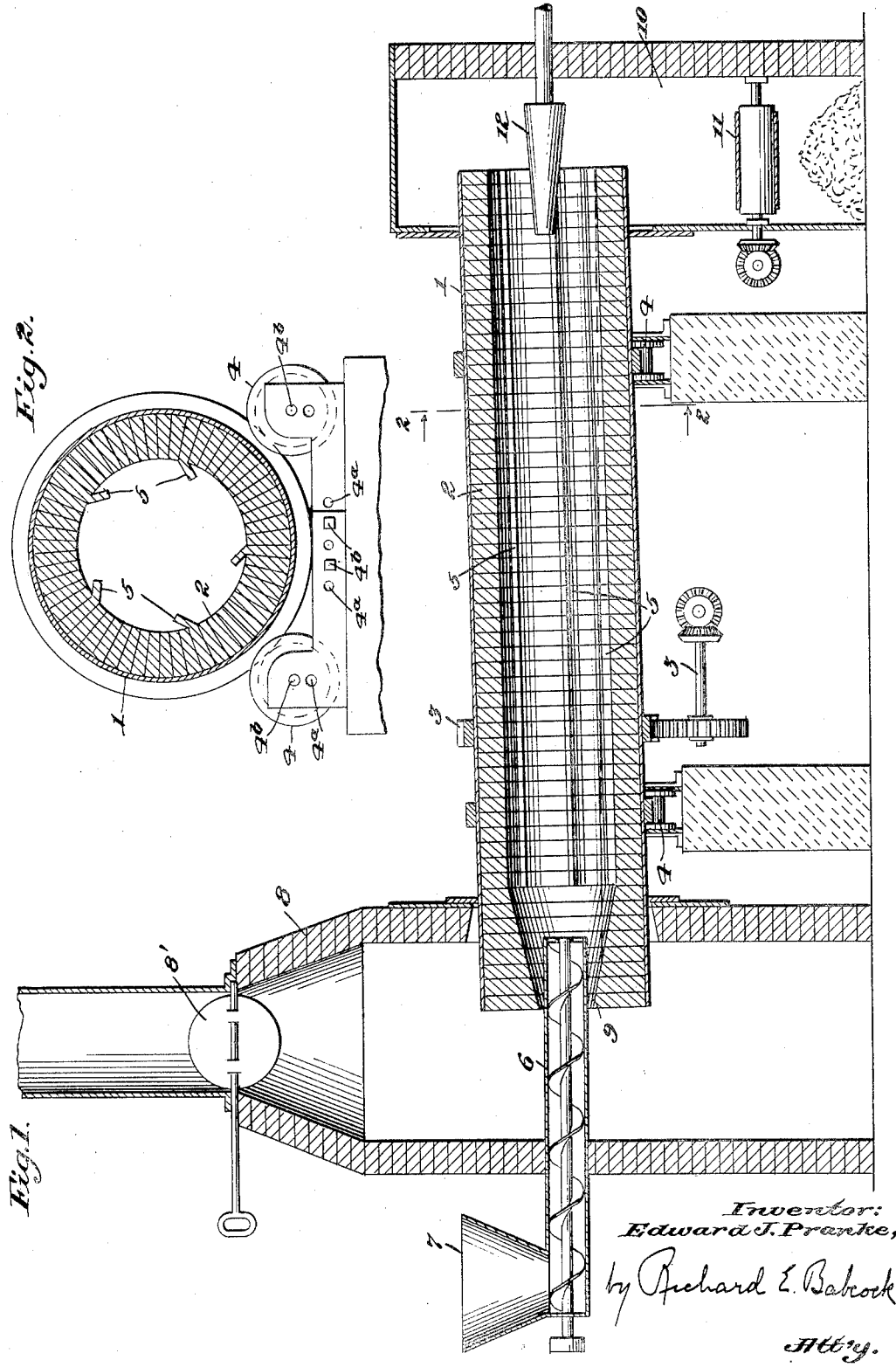

1,961,569

UNITED STATES PATENT OFFICE 1,961,569

PROCESS OF PRODUCING CYANIDES

Edward J. Pranke, Bayside, N. Y., assignor to Grangers Manufacturing Company, Boston, Mass., a corporation of Massachusetts Application January 3, 1929, Serial No. 330,000

3 Claims. (Cl. 23—80)

This invention relates to a process of producing cyanides, and has for its object to provide a procedure simpler and less costly to operate than the processes heretofore proposed.

It is well known that calcium carbide finely ground and heated to a bright red to white heat, and brought into contact with elemental nitrogen, will combine therewith to form calcium cyanamid. It has been proposed to make a cyanide compound by first producing a cyanamid compound by fixing elemental nitrogen in a carbide which will not melt at the temperature required for the fixation of the nitrogen, namely, a dark red to bright yellow heat, the reaction product being then subjected to a melting operation with the aid of a suitable flux whereby a cyanide is formed. The procedure has heretofore always been divided into two steps because it was found that nitrogen was not readily fixed by carbides or carbide-containing substances which melt at the temperature necessary for the fixation of the nitrogen; although it has been known that the nitrogen is readily absorbed and fixed in a mass of a finely divided carbide which does not melt at the temperature of such fixation.

I have discovered, however, that fixation of nitrogen takes place very readily and very efficiently in a fused carbide-containing mass when suitable means are provided for bringing the nitrogen into contact with substantially every part of the fused mass. This carbide-containing mass may be either a carbide such as calcium carbide which does not melt at the temperature of fixation except with the aid of a flux, or a carbide such as sodium carbide which fuses below the temperature necessary for nitrogen fixation. In either case the nitrogen found in the product is substantially all in the form of a cyanide compound. Thus I have succeeded in producing a cyanide compound by my process from atmospheric nitrogen and a fused carbide-containing mass, in a single step, which was heretofore considered impracticable.

Any carbide which is molten at the temperature at which it fixes nitrogen can be treated according to my process and in my apparatus to form a cyanide; and, in fact, any carbide which with the aid of a flux forms a fused mixture at the temperature required to fix the nitrogen will give a like result. I prefer to use calcium carbide on account of its low price, but other carbides may be employed, such as barium carbide, sodium carbide, potassium carbide or lithium carbide, or a combination of calcium or barium with an alkali metal carbide, such as calcium sodium carbide, $CaC_2 \cdot Na_2C_2$.

As fluxes I use any suitable salt which at the temperature at which nitrogen is fixed does not decompose the carbide even in the presence of an excess of carbon. I prefer to use sodium chloride on account of its low cost, but I may also use sodium carbonate or any alkali metal halid, carbonate or silicate.

I have found that the fixation of nitrogen by a mixture of calcium or other carbides and sodium chloride or other flux is an exothermic reaction, and that the heat released after the reaction is well started is substantially sufficient to heat the incoming charge and keep the reactions going with little or no additional heating. For ease of control, however, I prefer to introduce additional heat, and if necessary waste some of it.

I have further discovered that in operating my process I can use air instead of pure nitrogen by maintaining in my furnace an excess of suitable fuel, such as carbon in the form of charcoal or coke or other suitable form, which will combine with the oxygen of the air before reaching the fused mass and leave the nitrogen to combine with the molten charge. Such reducing fuel is preferably introduced through the fuel nozzle. An additional quantity of reducing agent may be mixed with the charge before introduction into the furnace, which has the function of substantially preventing the possible oxidation of carbide or cyanide. When mixed with the charge it also has the effect of making the charge more porous and more accessible to the action of the nitrogen.

A suitable charge I have found to be 100 parts by weight of commercial calcium carbide and 80 parts of sodium chlorid or 73 parts of actual sodium carbonate; or I may use 250 parts of barium carbide and 80 parts of sodium chlorid or 73 parts of actual sodium carbonate. A suitable amount of carbon in the charge I have found to be 10 parts by weight, in the form of charcoal. It is obvious, of course, that the proportions given may be varied considerably without departing from the spirit of my invention; but I have found the given proportions to be preferable. Nitrogen should be supplied in at least equal atomic proportions to the carbon present as carbide; that is, at least 14 parts of nitrogen to each 12 parts of carbon present as carbide, but I prefer to use an excess of nitrogen to facilitate the control of the operations.

Any means may be used which will cause intimate contact of the nitrogen or nitrogen containing gas with substantially every part of the fused charge, a suitable type of device being shown in the accompanying drawing by way of illustration; it being understood, of course, that the invention is not limited thereto.

In the accompanying drawing:

Figure 1 represents a more or less diagrammatic longitudinal sectional view of a suitable apparatus; and Figure 2, a cross-section thereof.

Referring in detail to the drawing, the furnace comprises a rotatable steel shell 1 provided with a fire-brick lining 2 of basic reaction. A suitable mechanism 3 is provided for rotating the furnace at the desired speed, the furnace being supported for rotation on the rollers 4, the adjustment of which vertically and horizontally by means of holes 4$^a$ and bolts or pins 4$^b$ provides a means for closely adjusting the longitudinal inclination of the furnace for controlling the amount of charge under treatment in the furnace, the rate of feed into the furnace controlling the length of time the material remains in the furnace, these adjustments, including the rate of feed, being selected according to the results obtained, as revealed by analysis of the product.

The furnace is provided interiorly with means for raising and dropping the fused charge, such, for example, as projecting flanges or shelves 5 of fire-brick similar in composition to those forming the lining 2. These flanges 5, on the rotation of the furnace, carry up some of the charge and, as the rotation continues, pour it back again, thereby subjecting the unreacted portions of such charge material very effectively to the action of the gaseous contents of the furnace. The speed of rotation which results in the most efficient agitation of the charge and fixation of nitrogen without causing injurious vibration to the furnace will normally be selected.

The charge may be introduced into the furnace by any suitable means, as, for example, a feed screw 6 receiving charge material from a hopper 7. The feed screw 6 may pass through the chimney 8 for the exit gases and into the mouth 9 of the furnace which projects into the chimney 8. Suitable controls, such as a damper 8', may be provided in the chimney 8.

A chamber 10 surrounds the discharge end of the furnace, and this may contain means, such as an endless belt conveyor 11 of suitable material, to receive the reaction product as it is discharged from the furnace and carry it off to a suitable location or container. One or more nozzles 12 are provided to act as fuel injectors for introducing gaseous, liquid or finely-divided solid fuel and air or other mixtures of nitrogen and oxygen or nitrogen alone, as may be required.

The charge is fed into the furnace at the charge end 9, the rate of feed and the rate of injection of the fuel and nitrogen all being so regulated that practically all of the charge will have reacted with the nitrogen before leaving the furnace at the discharge end thereof.

Instead of using the apparatus illustrated, I may heat the charge in any suitable container, for example, a closed crucible, until the desired temperature is reached and then pour the fused mass into an apparatus of the type of a Bessemer converter used for making steel and having the function or purpose of forcing nitrogen through the mass and bringing all portions thereof into intimate contact with nitrogen, causing the latter to be absorbed and fixed as a cyanide, after which the reaction product may be removed or dumped in the usual manner.

It is obvious that those skilled in the art may vary the details without departing from the spirit of this invention; and, therefore, I do not wish to be limited to the above disclosure, except as may be required by the claims.

In the practice of the process with the apparatus illustrated the components of the charge are mixed in finely pulverized solid form prior to introduction into the furnace where they are fused or melted. However, in the practice of my process it is not essential that they shall be initially subjected simultaneously to heat, but they may be separately or successively brought under the influence of heat; for example, the fusible ingredient may be introduced first, and the infusible ingredients thereafter added, and, therefore, the expression "melting the said mixture" is to be read with the above significance.

I do not mean that every particle of the fused mass must be melted, but it is sufficient if the mass as a whole is in a fluid state, although there be present infusible material in suspension in a finely divided unmelted state, and the expression "fused mass" as used in the claims is to be interpreted with the above significance.

The mixing of the carbonaceous material with the carbide containing charge increases the porosity of the mass, and accordingly facilitates the rate of fixation of nitrogen, and this applies not only to the carbide-containing mass above described, but also to any carbide mass, including those which do not fuse. In the production of cyanide by the present process it is preferred that the carbon be finely divided or ground charcoal, however, this is not essential, and as used in connection with other carbide masses in practically all nitrogen fixation processes utilizing carbides it may be either charcoal, coke or other carbonaceous material and of a wide range of size and shape.

Having thus described my invention, what I claim as new and desire to secure by Letters Patent is:

1. The process of producing cyanide which consists in mixing calcium carbide with sodium chlorid, melting the mixture, causing portions of the fused carbide mass to be repeatedly raised and freely dropped in an atmosphere of nitrogen, and cooling the reaction product.

2. The process of producing cyanide which consists in mixing calcium carbide with sodium chlorid, melting the mixture, causing portions of the fused carbide mass to be raised and freely dropped in an atmosphere of nitrogen until substantially all portions capable of fixing nitrogen have combined therewith, and cooling the reaction product.

3. The process of producing cyanide which consists in mixing calcium carbide with sodium chlorid and carbon, melting the carbide mixture, causing portions of the fused mass to be raised and freely dropped in an atmosphere of nitrogen until substantially all portions capable of fixing nitrogen have combined therewith, and cooling the reaction product.

EDWARD J. PRANKE.